(12) United States Patent
Lacroute et al.

(10) Patent No.: US 7,870,291 B1
(45) Date of Patent: *Jan. 11, 2011

(54) PACKET PRIORITIZATION SYSTEMS AND METHODS USING ADDRESS ALIASES

(75) Inventors: Philippe Lacroute, Sunnyvale, CA (US); Matthew A. Tucker, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/170,985

(22) Filed: Jul. 10, 2008

Related U.S. Application Data (63) Continuation of application No. 11/620,473, filed on Jan. 5, 2007, now Pat. No. 7,415,533, which is a continuation of application No. 10/261,929, filed on Oct. 2, 2002, now Pat. No. 7,191,249.

(60) Provisional application No. 60/388,360, filed on Jun. 14, 2002.

(51) Int. Cl.
*G06F 15/16* (2006.01)
*G06F 15/173* (2006.01)

(52) U.S. Cl. .................. 709/240; 709/224; 709/234; 709/235; 709/238

(58) Field of Classification Search .............. 370/412, 370/448, 450; 709/224, 235, 238, 240
See application file for complete search history.

(56) References Cited

U.S. PATENT DOCUMENTS

| | | | |
|---|---|---|---|
| 5,568,469 | A | 10/1996 | Sherer et al. |
| 5,786,917 | A | 7/1998 | Maeno |
| 6,078,943 | A | 6/2000 | Yu |
| 6,512,741 | B1 | 1/2003 | Kohzuki et al. |
| 6,570,876 | B1 | 5/2003 | Aimoto |
| 6,700,899 | B1 | 3/2004 | Cao |
| 6,912,255 | B2 | 6/2005 | Drezner et al. |
| 6,914,881 | B1 | 7/2005 | Mansfield et al. |
| 2003/0058876 | A1 | 3/2003 | Connor et al. |
| 2003/0058878 | A1 | 3/2003 | Minnick et al. |

OTHER PUBLICATIONS

Philippe Lacroute et al. "Packet Prioritization Systems and Methods Using Address Aliases"; U.S. Appl. No. 10/261,929, filed Oct. 2, 2002; 35 pages.

Philippe Lacroute et al. "Packet Prioritization Systems and Methods Using Address Aliases"; U.S. Appl. No. 11/620,473, filed Jan. 5, 2007; 26 pages.

*Primary Examiner*—Quang N. Nguyen
(74) *Attorney, Agent, or Firm*—Harrity & Harrity, LLP (57) ABSTRACT

A switch fabric includes input links, output links, and at least one switching element. The input links are configured to receive data items that include destination addresses. At least some of the data items have different priority levels. The output links are configured to output the data items. Each of the output links is assigned multiple ones of the destination addresses. Each of the destination addresses corresponds to one of the priority levels. The switching element(s) is/are configured to receive the data items from the input links and send the data items to ones of the output links without regard to the priority levels of the data items.

17 Claims, 9 Drawing Sheets

PACKET PRIORITIZATION SYSTEMS AND METHODS USING ADDRESS ALIASES

RELATED APPLICATIONS

This application is a continuation of U.S. patent application Ser. No. 11/620,473, filed Jan. 5, 2007, now U.S. Pat. No. 7,415,553, issued Aug. 19, 2008, which is a continuation of U.S. application Ser. No. 10/261,929, filed Oct. 2, 2002, now U.S. Pat. No. 7,191,249, issued Mar. 13, 2007, which claims priority under 35 U.S.C. §119 based on U.S. Provisional Application No. 60/388,360, filed Jun. 14, 2002, the disclosures of which are all incorporated herein by reference.

BACKGROUND OF THE INVENTION

1. Field of the Invention

The present invention relates generally to data transfer and, more particularly, to systems and methods that use address aliases for packet prioritization.

2. Description of Related Art

Network devices, such as routers, receive data on physical media, such as optical fiber, analyze the data to determine its destination, and output the data on physical media in accordance with the destination. The traffic through a router may broadly fall into two categories: low priority traffic and high priority traffic. Low priority traffic includes best-effort traffic with no service guarantee (i.e., the traffic has no guarantee on latency). High priority traffic includes traffic with strong guarantees on latency, such as voice traffic. High priority traffic may be guaranteed a maximum latency even when the router is congested with low priority traffic.

Conventional routers typically include a series of queues and staging buffers (e.g., first-in, first-out (FIFO) memories) that can fill up with long low priority packets. As a result, conventional routers generally include mechanisms to permit high priority packets to bypass low priority packets wherever congestion can occur so that high priority packets do not get delayed due to low priority packets.

For example, a router may include separate sets of queues and staging buffers for high priority packets, thereby permitting high priority packets to bypass congestion caused by low priority packets. Arbiters in the router may then be programmed to select high priority packets over low priority packets. Because the rate at which high priority packets enter the router may be set based, for example, on a service level agreement, the latency through the router can be guaranteed for high priority packets. A problem with this approach is that it is expensive because it requires extra logic for handling multiple priority levels and dedicated high priority queues and staging buffers throughout the router.

As a result, there is a need for a less expensive alternative that guarantees an amount of latency through a network device for high priority packets, regardless of any congestion caused by low priority packets.

SUMMARY OF THE INVENTION

Systems and methods consistent with the principles of the invention address this and other needs by using separate destination addresses for high and low priority traffic flows intended for the same destination. The systems and methods fairly treat all traffic flows equally to guarantee that no two flows can block each other.

One aspect consistent with the principles of the invention includes a switch fabric that includes input links, output links, and at least one switching element. The input links are configured to receive data items that include destination addresses. At least some of the data items have different priority levels. The output links are configured to output the data items. Each of the output links is assigned multiple ones of the destination addresses. Each of the destination addresses corresponds to one the priority levels. The switching element(s) is/are configured to receive the data items from the input links and send the data items to ones of the output links without regard to the priority levels of the data items.

Another aspect consistent with the principles of the invention includes a switch fabric that includes input links, output links, and at least one switching element. The input links are configured to receive data items that include destination addresses, where the data items have a number of different priority levels. The output links are configured to output the data items. Each of the output links is assigned multiple ones of the destination addresses. Each of the destination addresses corresponds to one of the priority levels. The switching element(s) is/are configured to receive the data items from the input links, map the destination addresses for the data items to the output links to identify ones of the output links to receive the data items, and send the data items to the identified ones of the output links.

Yet another aspect consistent with the principles of the invention includes a method for processing packets that include multiple priority levels. The method includes storing the packets in buffers based on the priority levels of the packets and destinations of the packets, where each of the destinations is assigned multiple addresses corresponding to the priority levels; selecting the packets from the buffers; and outputting the packets according to the destination addresses.

A further aspect consistent with the principles of the invention includes a network device that includes data processors connected to a switch fabric. The data processors include buffers that temporarily store data items and a processing unit that processes the data items for transmission to destination addresses. The buffers are grouped into sets based on priority levels and the destinations of the data items. Each of the buffer sets includes multiple ones of the buffers corresponding to one of the destinations. Each of the destinations is assigned multiple addresses corresponding to the number of priority levels. The switch fabric is unaware of the priority levels of the data items. The switch fabric includes at least one switching element that receives the data items from the data processors and sends the data items to ones of the destinations without regard to the priority levels of the data items.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention provide different destination addresses for each packet destination. One of the destination addresses is used for high priority packet flows and the other is used for low priority packet flows. The systems and methods may treat each flow fairly and give the flows equal bandwidth on the output link. This guarantees that no two flows can block each other.

System Configuration

Figure 1:
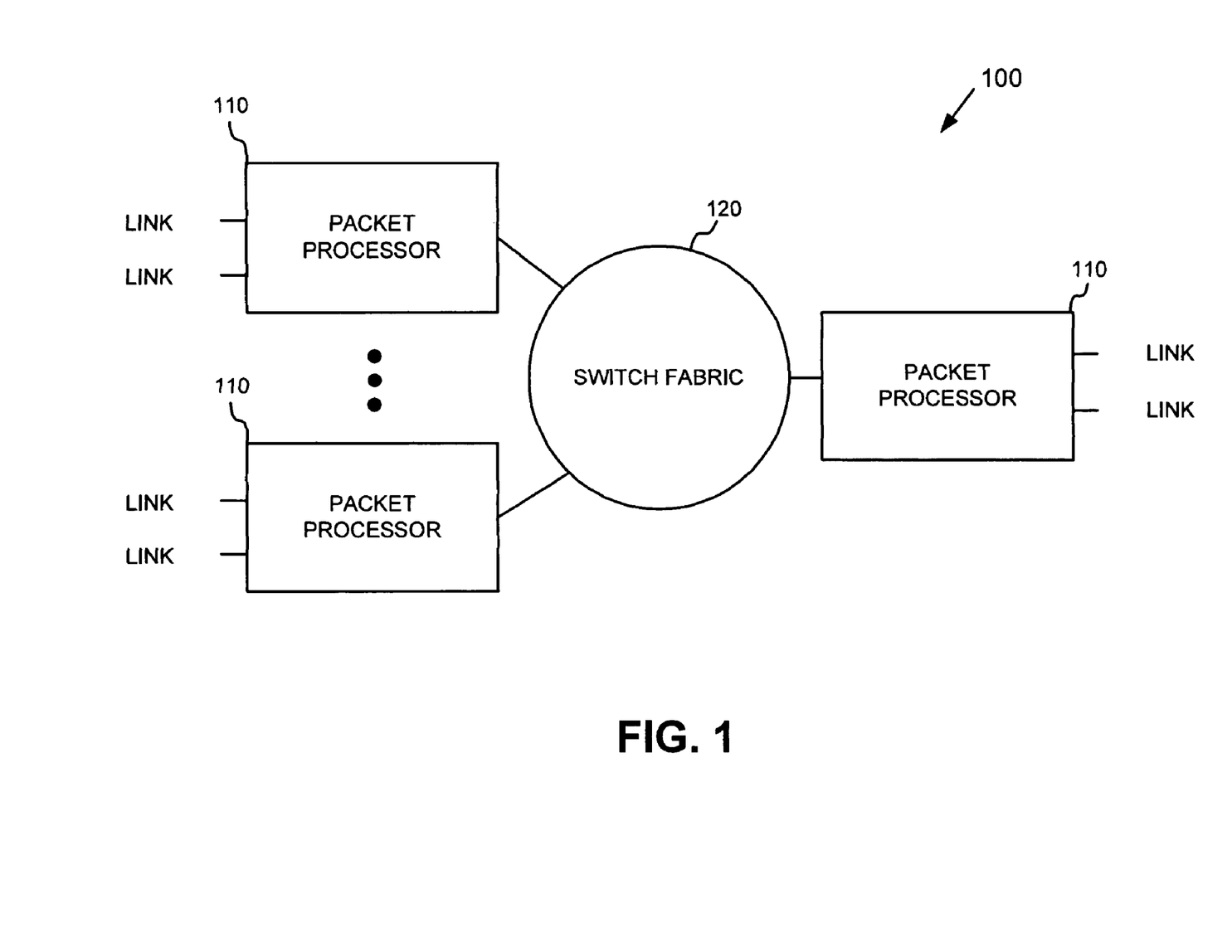
FIG. 1 is a block diagram illustrating an exemplary routing system in which systems and methods consistent with principles of the invention may be implemented.

FIG. 1 is a block diagram illustrating an exemplary routing system 100 in which systems and methods consistent with the principles of the invention may be implemented. System 100 receives packet traffic from a physical link, processes the packet traffic to determine destination information, and transmits the packet traffic out on a link in accordance with the destination information.

System 100 may include packet processors 110 interconnected by a switch fabric 120. While FIG. 1 shows three packet processors 110 connected to switch fabric 120, more or fewer packet processors 110 may connect to switch fabric 120 in other implementations consistent with the principles of the invention.

Packet processors 110 receive packet data on physical links connected to a network, such as a wide area network (WAN), a local area network (LAN), or another system. Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

A packet processor 110 may process incoming packet data prior to transmitting the data to another packet processor or on the physical link. Packet processor 110 may also perform a route lookup for the data using forwarding tables to determine destination information. If the destination indicates that the data should be sent out on a physical link connected to packet processor 110, then packet processor 110 prepares the data for transmission by, for example, adding any necessary headers, and transmits the data from the port associated with the physical link. If the destination indicates that the data should be sent to another packet processor via switch fabric 120, then packet processor 110 prepares the data for transmission to the other packet processor, if necessary, and sends the data to the other packet processor via switch fabric 120.

Figure 2:
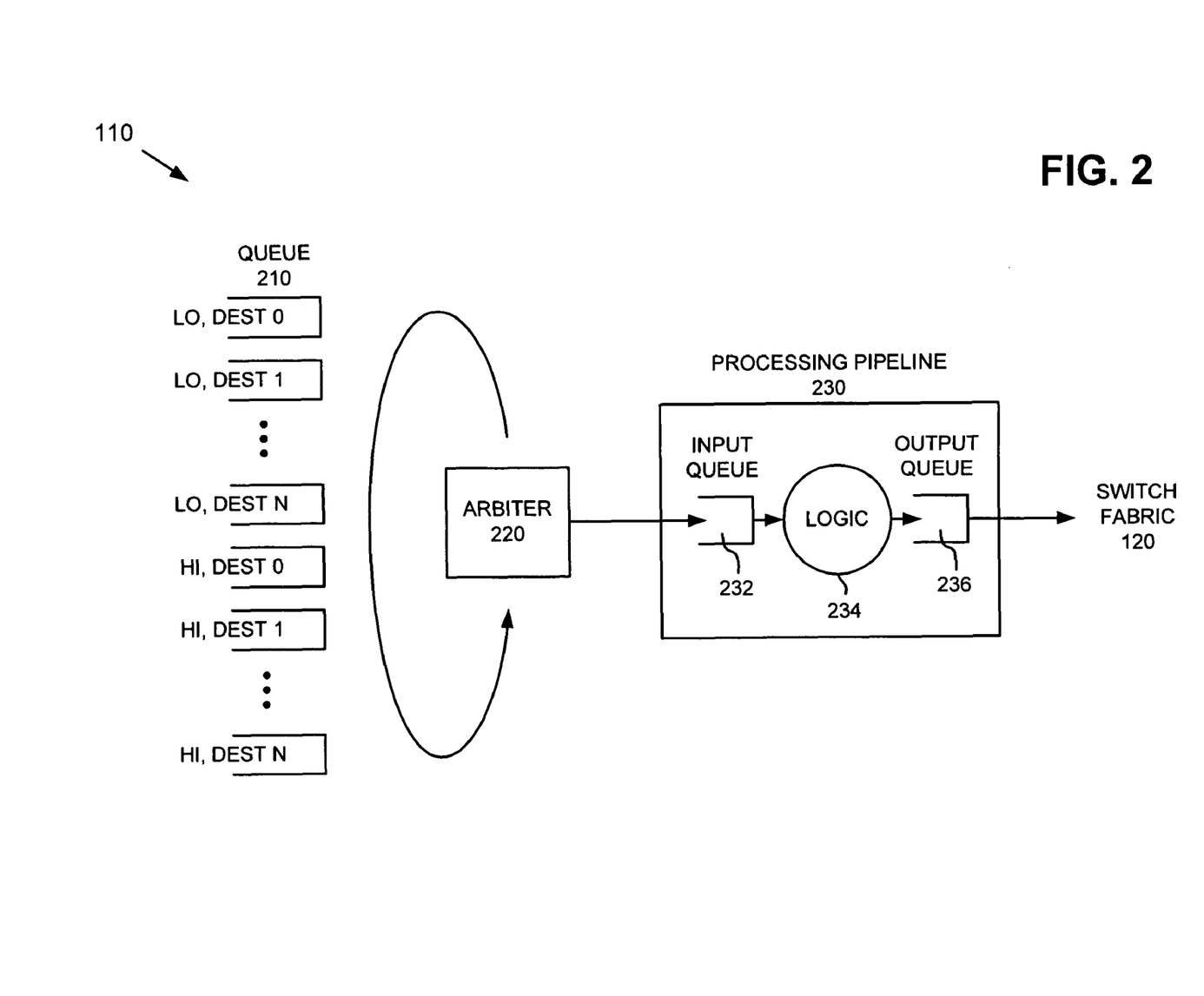
FIG. 2 is an exemplary diagram of a portion of a packet processor of FIG. 1 according to an implementation consistent with the principles of the invention.

FIG. 2 is an exemplary diagram of a portion of a packet processor 110 according to an implementation consistent with the principles of the invention. Packet processor 110 includes queue 210, arbiter 220, and processing pipe 230. Queue 210 may include sets of buffers, such as FIFO memories. In an implementation consistent with the principles of the invention, a pair of buffers corresponds to each destination, where a destination may relate to an output port or link of switch, fabric 120. Each destination is assigned two addresses: a first address for low priority traffic and a second address for high priority traffic. Both addresses map to the same physical destination, but are used to distinguish high priority traffic from low priority traffic.

One buffer in a pair of buffers corresponding to a particular destination may be a low priority buffer and the other buffer a high priority buffer. The low priority buffer may be used for best-effort traffic (i.e., traffic for which there is no guarantee on latency). The high priority buffer may be used for traffic with strong guarantees on latency (e.g., voice traffic). There may be a high level of low priority traffic such that the low priority buffers fill and, possibly, become congested. The high priority traffic may be limited or controlled, however, such as by a service level agreement or a policer, such that the high priority buffers may remain practically empty.

Each packet received by packet processor 110 may be stored in the appropriate buffer based on the destination of the packet and the packet's priority. A packet's priority may be determined based on characteristics of the packet, such as the source of the packet or the protocol used by the packet. Every Internet Protocol (IP) packet includes a priority field in its header. The packet's priority may be set when the packet enters the network and carried along with the packet as the packet travels through the network. Packet processor 110 may use this priority information to determine a packet's priority.

Arbiter 220 may include arbitration logic to select packets from queue 210 and output them to processing pipeline 230. Arbiter 220 may use an arbitration scheme that gives preference to high priority traffic over low priority traffic in queue 210. As a result; later-received high priority packets may be selected and output by arbiter 220 sooner than earlier-received low priority packets.

Processing pipeline 230 may receive the packets from arbiter 220 and process them before sending them out to switch fabric 120. In one implementation, processing pipeline 230 includes input queue 232, processing logic 234, and output queue 236. While FIG. 2 shows only a single input queue 232, processing logic 234, and output queue 236, one or more of these components may be replicated one or more times in implementations consistent with the principles of the invention.

Input queue 232 may include a buffer, such as a FIFO memory, that receives the packets from arbiter 220 and temporarily stores them to await processing by processing logic 234. Processing logic 234 may perform processing-related functions on packets it receives from input queue 232. For example, processing logic 234 may retrieve packet information from memory (not shown) and, possibly, store some or all of the route lookup results in the packet headers. Output queue 236 may include a buffer, such as a FIFO memory, that receives the packets from processing logic 234 and temporarily stores them to await transmission to switch fabric 120.

Figure 3:
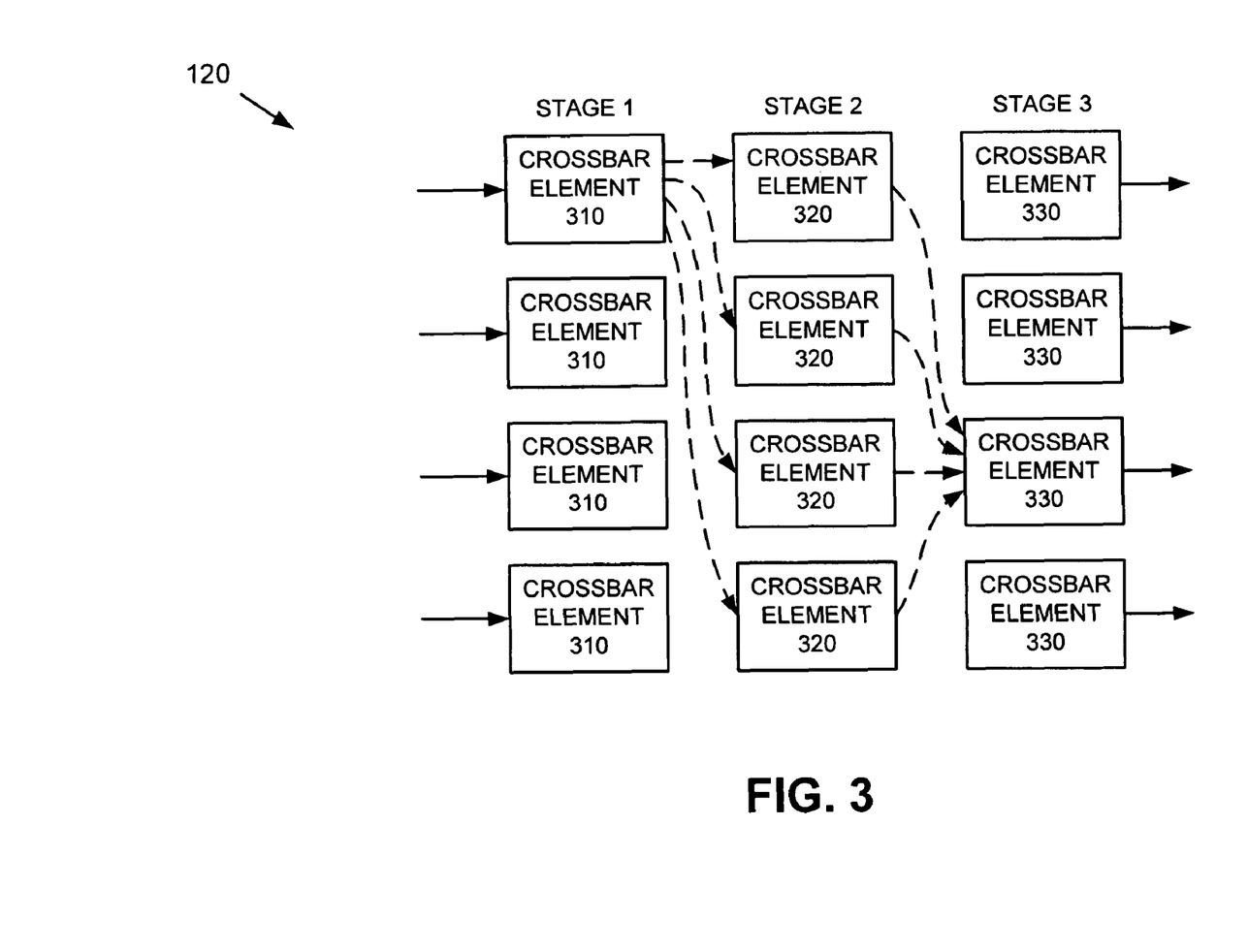
FIG. 3 is an exemplary diagram of the switch fabric of FIG. 1 according to an implementation consistent with the principles of the invention.

FIG. 3 is an exemplary diagram of switch fabric 120 according to an implementation consistent with the principles of the invention. In this particular implementation, switch fabric 120 takes the form of a three stage Clos switch. In other implementations, switch fabric 120 may be configured differently.

Switch fabric 120 may concurrently process several packet flows, where each packet flow may include packets sent from a particular source to a particular destination address. Switch fabric 120 has a fairness property, such that it treats all packet flows equally (i.e., without regard to priorities) and permits the flows to equally share the output bandwidth. When sending packets across switch fabric 120, according to implementations consistent with the principles of the invention, the headers used for routing the packets may include a destination field and/or a source field but no priority field. The destination address stored in the destination field and/or the source address stored in the source field implicitly include(s) priority information. Multiple destination addresses that correspond to the same physical destination may be used to represent the different priority levels associated with the packets.

As shown in FIG. 3, switch fabric 120 includes three stages of crossbar elements 310-330. Although the connections are not illustrated, each crossbar element of stage 1 is connected to each crossbar element of stage 2, and each crossbar element of stage 2 is connected to each crossbar element of stage 3. The first stage is the spray stage in which crossbar elements 310 may send packets they receive to all crossbar elements 320 in the second stage. Crossbar elements 310 may do so without regard to the destinations of the packets.

The second stage is the determination stage in which crossbar elements 320 may determine to which of crossbar elements 330 in the third stage to send packets received from the first stage. For example, a crossbar element 320 may use the high order bits of the destination address to select the appropriate crossbar element 330 to which to send a packet. The third stage is the output stage in which crossbar elements 330 determine the appropriate output links for packets received from the second stage. For example, a crossbar element 330 may use the low order bits of the destination address to select the appropriate output link for a packet. Alternatively, crossbar elements 320 and 330 may use the low and high order bits, respectively, when determining how to output a packet.

Figure 4:
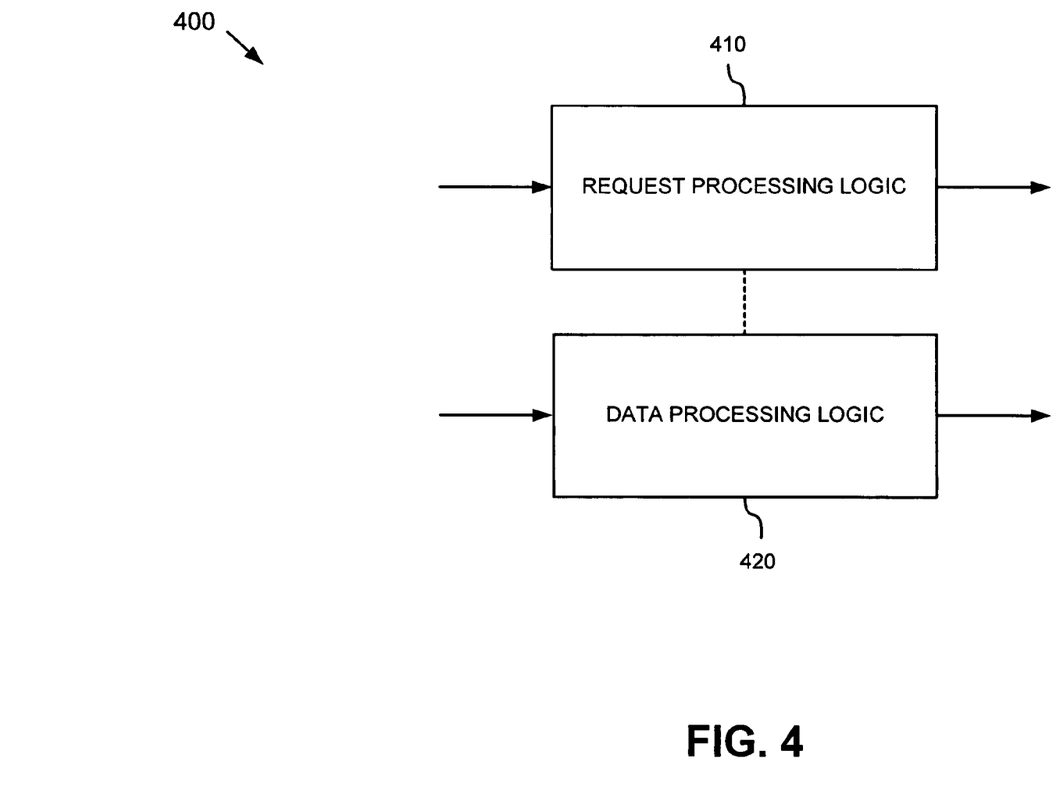
FIG. 4 is an exemplary diagram of a crossbar element of FIG. 3 according to an implementation consistent with the principles of the invention.

FIG. 4 is an exemplary diagram of a crossbar element 400 according to an implementation consistent with the principles of the invention. Crossbar element 400 may correspond to crossbar element 310, 320, and/or 330. Crossbar element 400 may include multiple input links and multiple output links through which it respectively receives and outputs packets.

Crossbar element 400 may include request processing logic 410 and data processing logic 420. Request processing logic 410 and data processing logic 420 perform separate functions that may exchange information (represented by the dotted line) and are, therefore, shown as separate logical blocks. In practice, a single component or separate components may implement the functions of request processing logic 410 and data processing logic 420.

Before a packet processor 110 or, possibly, one of the crossbar elements 310 or 320 transmits a packet to a crossbar element, it transmits a request for transmission of the packet. Request processing logic 410 may receive and process the request. Request processing logic 410 may receive a request, and possibly other information, from a packet processor or another crossbar element, process the request, and output the request to another crossbar element or a packet processor.

Figure 5:
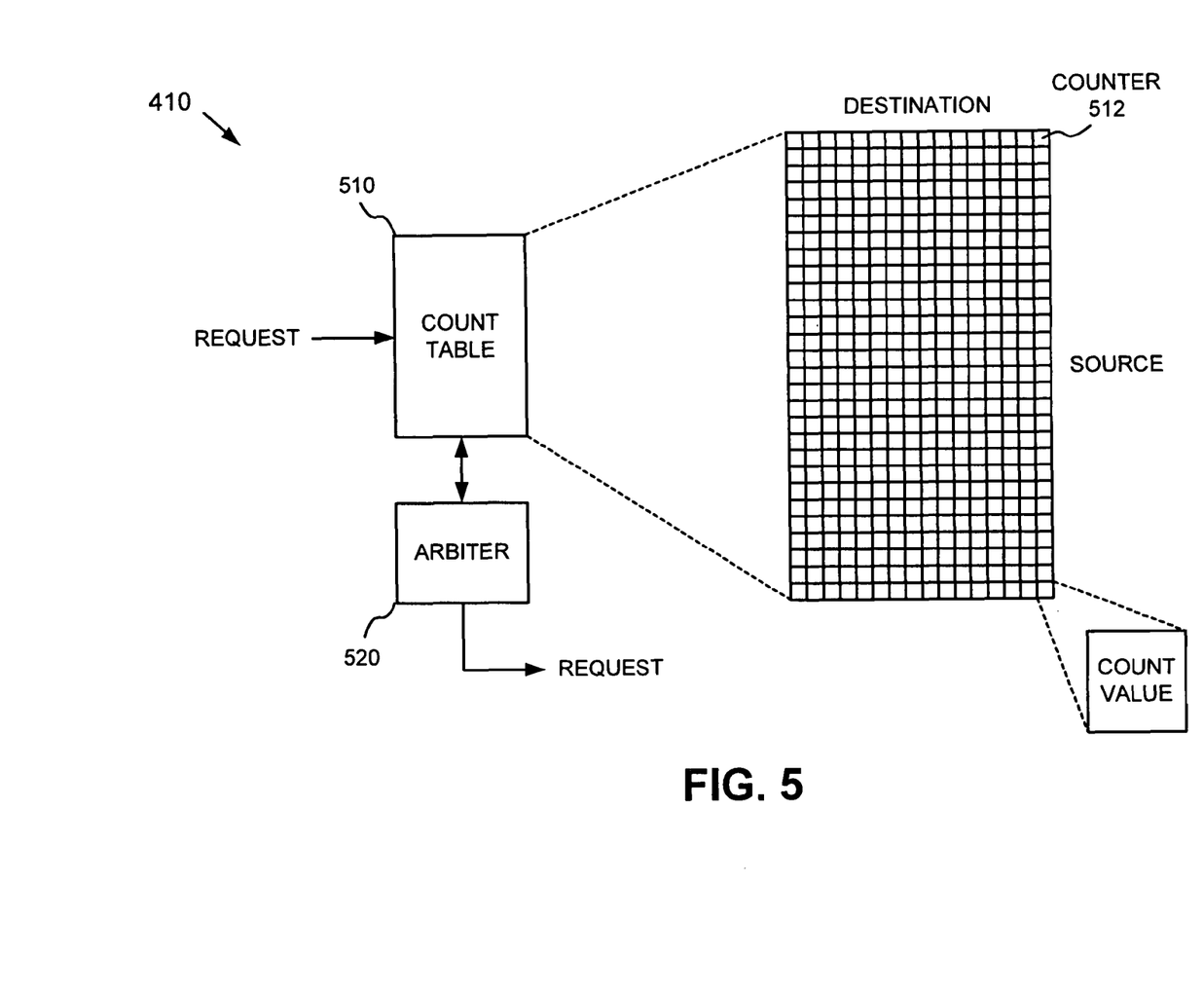
FIG. 5 is an exemplary diagram of the request processing logic of FIG. 4 according to an implementation consistent with the principles of the invention.

FIG. 5 is an exemplary diagram of request processing logic 410 according to an implementation consistent with the principles of the invention. Request processing logic 410 may include count table 510 and arbiter 520. Count table 510 may include an array of counters 512 addressable by a packet's source and destination addresses. Each of counters 512 may store a count value that reflects the number of requests received from a particular source (address) intended for a particular destination (address). When count table 510 receives a request, count table 510 uses the source and destination addresses from the request to address one of counters 512 and increment it.

During operation, it may be typical to have a high count value for low priority packet destinations and a small, or no, count value for high priority destinations. One reason for this may be that transmission of high priority packets may be limited or controlled. Low priority packets generally have no such limits or controls.

Arbiter 520 may include arbitration logic to select requests from counters 512 with non-zero count values. In one implementation, arbiter 520 may use a round robin scheme to examine counters 512. Once arbiter 520 selects a counter 512, arbiter 520 may grant a request from the particular source to the particular destination and decrement the count value associated with the counter. Because counters 512 associated with high priority packets may have small, or no, count values, later-received high priority packets may be serviced prior to earlier-received low priority packets.

Returning to FIG. 4, data processing logic 420 may process packets transmitted through switch fabric 120. Data processing logic 420 may receive a packet, and possibly other information, from a packet processor or another crossbar element, process the packet, and output the packet to another crossbar element or a packet processor.

Figure 6:
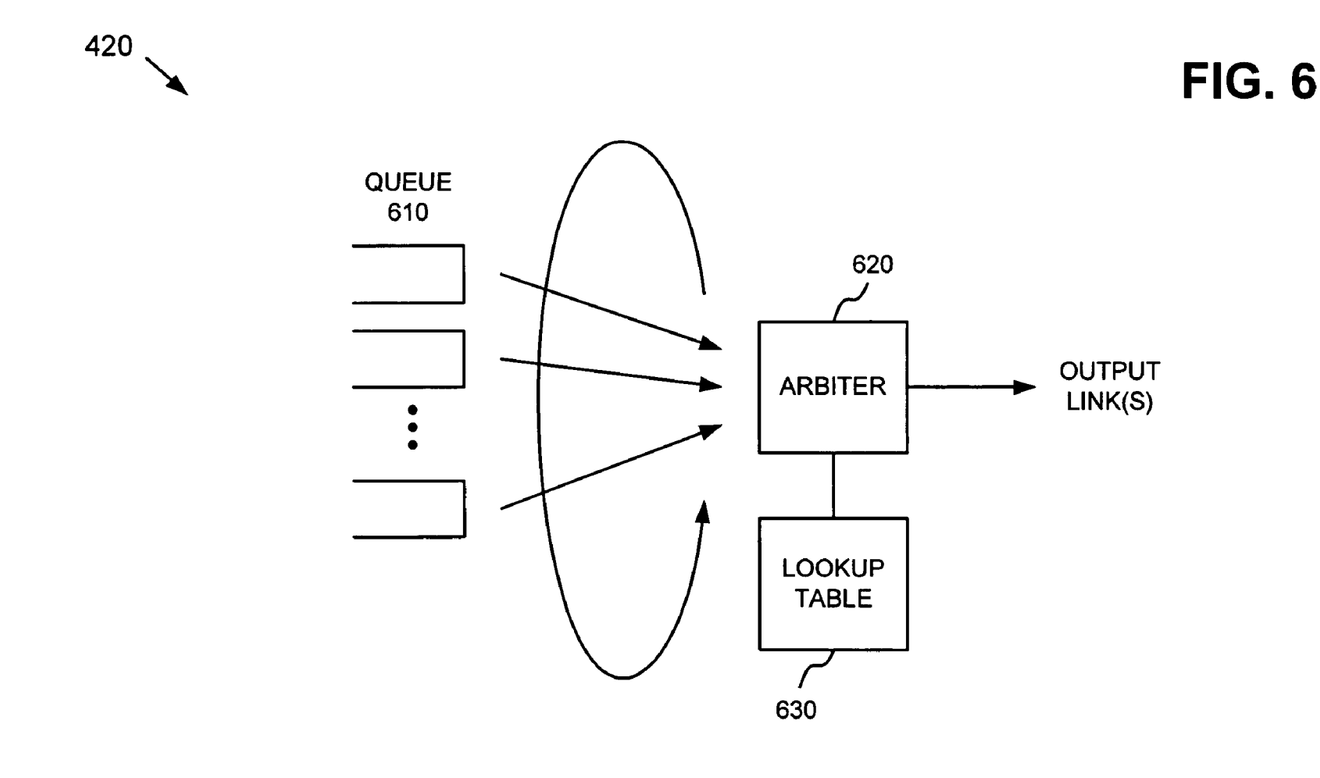
FIG. 6 is an exemplary diagram of the data processing logic of FIG. 4 according to an implementation consistent with the principles of the invention.

FIG. 6 is an exemplary diagram of data processing logic 420 according to an implementation consistent with the principles of the invention. Data processing logic 420 may include queue 610, arbiter 620, and lookup table 630. Queue 610 may include buffers, such as FIFO memories, that temporarily store packets. In an implementation consistent with the principles of the invention, queue 610 includes one buffer for each input link of crossbar element 400. In other implementations, queue 610 may include buffers that store packets from multiple input links.

Arbiter 620 may include arbitration logic to select packets from non-empty buffers in queue 610 and output them on one or more output links. Arbiter 620 may use a fair arbitration scheme without regard to high and low priority flows, such as a round robin scheme, to determine which buffer to select next. Arbiter 620 may give all of the packet flows an equal share of bandwidth on the output link(s).

Packets transmitted through switch fabric 120 may include no priority information. Instead, a packet's priority may be determined from the packet's source and/or destination address. As described above, high priority packets and low priority packets intended for the same output link contain different destination addresses. Lookup table 630 may map the destination addresses to the output links. Arbiter 620 may use lookup table 630 when determining how to route a packet possessing a particular destination address. Because high priority flows and low priority flows for a particular destination have been assigned different addresses, lookup tables 630, especially within the third stage of switch fabric 120, are programmed to inform their respective arbiter 620 that both addresses map to the same output link.

System Processing

Figure 7:
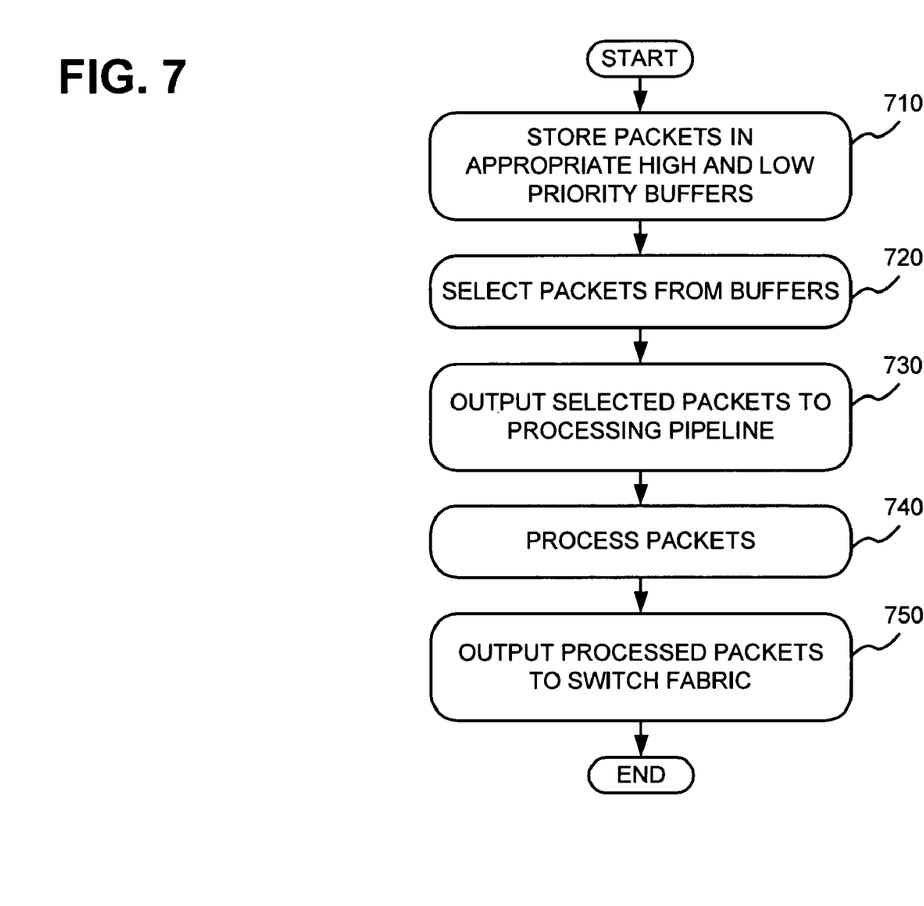
FIG. 7 is a flowchart of exemplary processing by a packet processor according to an implementation consistent with the principles of the invention.

FIG. 7 is a flowchart of exemplary processing by a packet processor 110 according to an implementation consistent with the principles of the invention. Processing may begin with packet processor 110 receiving packets on one or more input links. Packet processor 110 may determine the destinations and priorities of the packets from, for example, information contained in the packets. For example, packet processor 110 may read information from the header of a packet to determine the destination and priority of the packet.

Packet processor 110 may store the packets in queue 210 (FIG. 2) based on the destinations and priorities of the packets (act 710). For example, packet processor 110 may store a packet in a high priority buffer assigned to destination N if the packet's priority indicates that it is a high priority packet and the packet's destination is destination N. During operation, the low priority buffers may fill with low priority packets and, possibly, become congested. The high priority buffers may remain, however, at a relatively unfilled state (e.g., empty). This may occur when the transmission of high priority packets is limited or controlled by, for example, a service level agreement or a policer.

Arbiter 220 may select packets from non-empty buffers in queue 210 using an arbitration scheme that gives preference to high priority packets over low priority packets within queue 210 (act 720). In this way, arbiter 220 may select later-received high priority packets over earlier-received low priority packets. Arbiter 220 may output the selected packets to processing pipeline 230 (act 730).

Processing pipeline 230 may process the packets, if necessary, for transmission to switch fabric 120 (act 740). For example, processing pipeline 230 may retrieve packet information from memory and, possibly, store route lookup results in the packet headers. Processing pipeline 230 may then output the processed packets to switch fabric 120 (act 750).

Figure 8A:
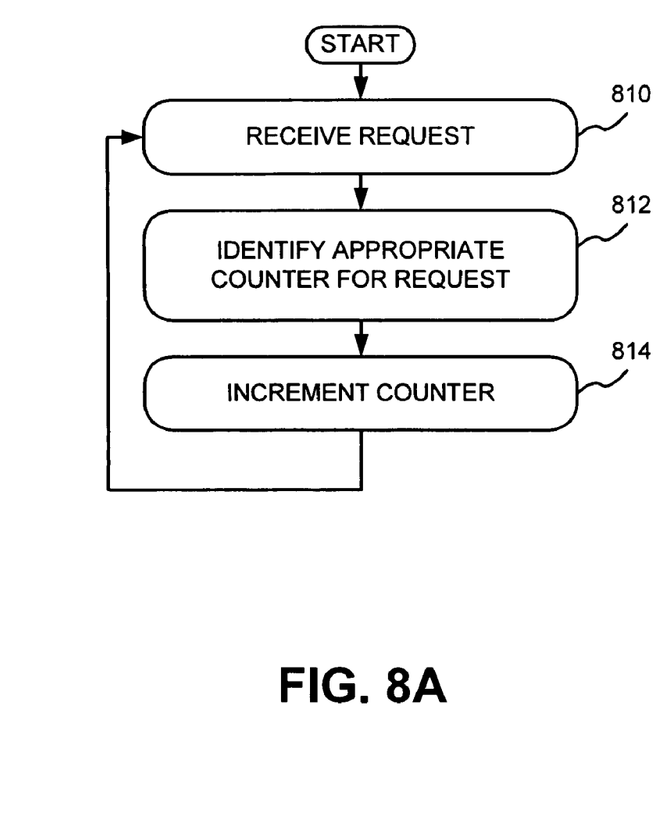
FIGS. 8A and 8B are flowcharts of exemplary processing by request processing logic according to an implementation consistent with the principles of the invention.
Figure 8B:
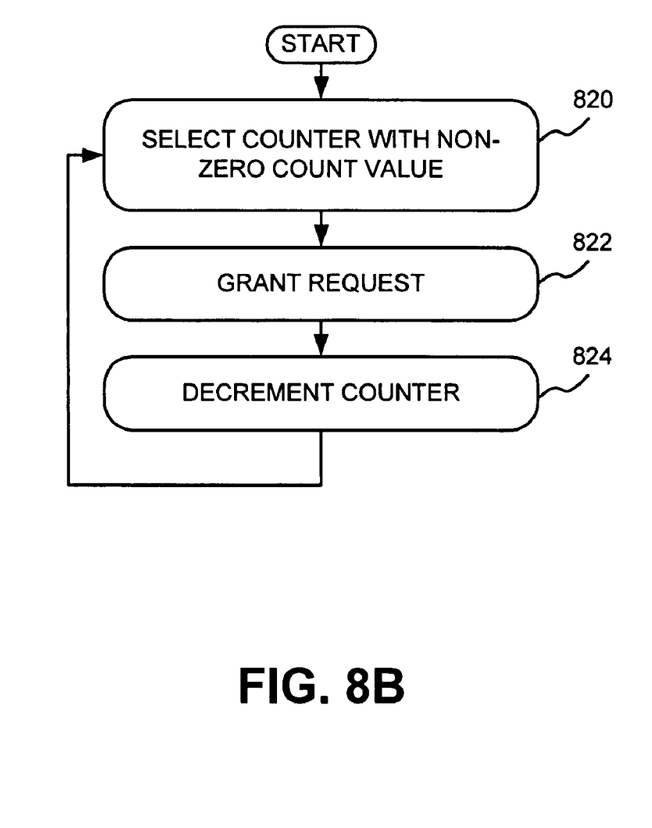

As discussed above, before a packet processor 110 transmits a packet to switch fabric 120, packet processor 110 transmits a request for transmission of the packet. Request processing logic 410 may receive and process the request. FIGS. 8A and 8B are flowcharts of exemplary processing by request processing logic 410 according to an implementation consistent with the principles of the invention. Processing may begin with request processing logic 410 receiving a request from a packet processor 110 (act 810) (FIG. 8A).

Based on the contents of the request, request processing logic 410 may identify the appropriate counter 512 within count table 510 (act 812). For example, request processing logic 410 may use the source and destination addresses from the request to address one of counters 512. Request processing logic 410 may then increment the count value of counter 512 (act 814).

Arbiter 520 may periodically visit count table 510 to select a counter 512 with a non-zero count value (act 820) (FIG. 8B). Because counters 512 associated with high priority packets may, in practice, have small, or no, count values, later-received high priority packets may be serviced by arbiter 520 prior to earlier-received low priority packets. Once arbiter 520 selects a counter 512, arbiter 520 may grant the request for transmission of a packet from the source address to the destination address corresponding to counter 512 (act 822). A request grant may include the transmission of the request to a connected crossbar element or packet processor or notification of the grant to data processing logic 420. Arbiter 520 may then decrement counter 512 (act 824).

Figure 9:
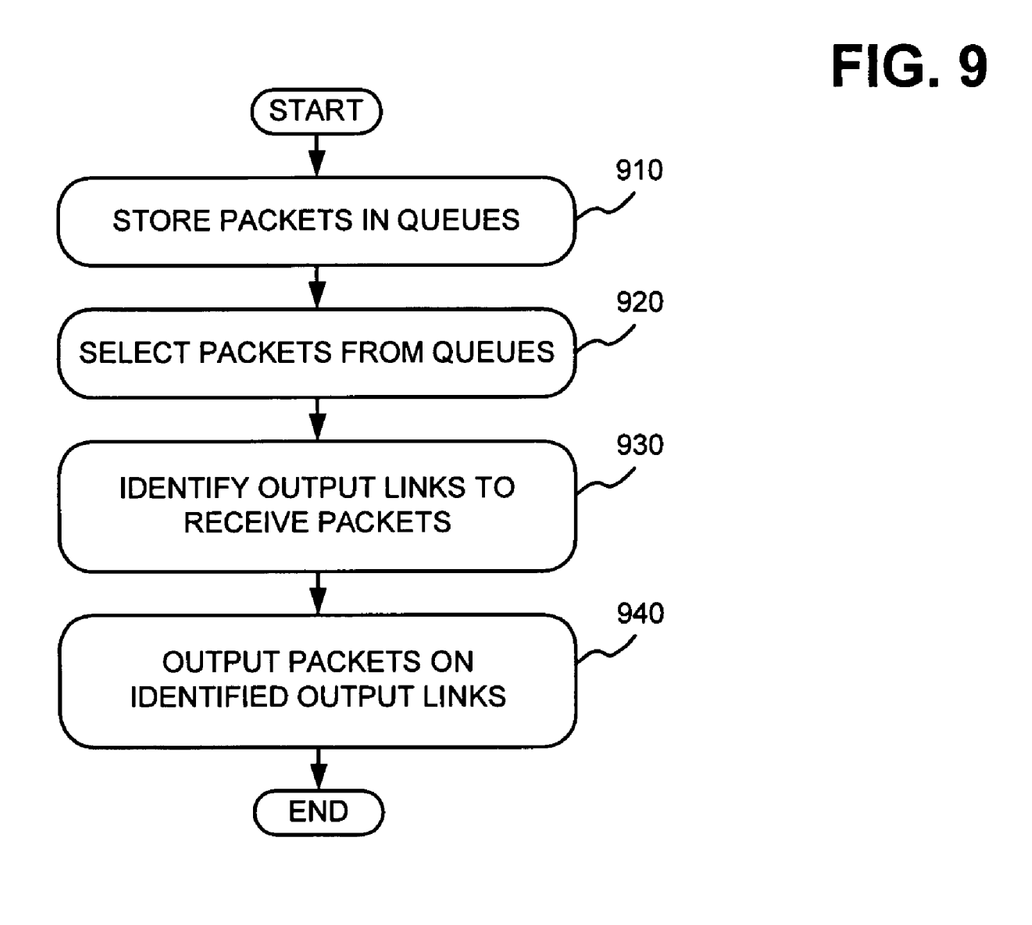
FIG. 9 is a flowchart of exemplary processing by data processing logic according to an implementation consistent with the principles of the invention.

Once its request has been granted by request processing logic 410, packet processor 110 may transmit a packet to data processing logic 420. FIG. 9 is a flowchart of exemplary processing by data processing logic 420 according to an implementation consistent with the principles of the invention. Processing may begin with data processing logic 420 receiving packets from packet processor(s) 110.

Data processing logic 420 may store the packets it receives in queue 610 (act 910). The packets may be stored in the buffers of queue 610 based on the links on which they were received.

Arbiter 620 may select packets from non-empty buffers in queue 610 according to a fair arbitration scheme (act 920). For example, arbiter 620 may use a round robin scheme to select a packet from the next non-empty buffer in queue 610, without regard to the packet's priority.

For each selected packet, arbiter 620 may identify the output link on which to transmit the packet (act 930). Arbiter 620 may use lookup table 630 to map the destination address for the packet to an output link. Because high and low priority packets intended for the same output link are assigned different destination addresses, lookup table 630 maps these addresses to the same output link. Arbiter 620 may then output the packets on the identified output links (act 940).

Conclusion

Systems and methods consistent with the principles of the invention provide separate destination addresses for high and low priority traffic flows intended for the same destination. The systems and methods use fair arbitration schemes to treat all traffic flows equally, thereby guaranteeing that no two flows block each other.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the context of a routing system, concepts consistent with the principles of the invention can be implemented in any system, device, or chip that handles data of different priorities.

Also, systems and methods have been described as processing packets. In alternate implementations, systems and methods consistent with the principles of the invention may operate upon other types or formats of data or data units.

Moreover, systems and methods consistent with the principles of the invention have been described in terms of two priority levels (i.e., high and low). In other implementations, more than two priority levels may be used.

Further, certain portions of the invention have been described as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A system comprising:
   a plurality of buffers to temporarily store data units, the buffers being grouped into sets based on destinations of the data units, each of the buffer sets including multiple ones of the buffers corresponding to a plurality of priority levels, each of the destinations being assigned a plurality of addresses, each of the plurality of addresses corresponding to a different one of the plurality of priority levels;

a count table to track requests for transmission of one or more of the data units, where the data units include headers containing no priority filed relating to the priority levels of the data units;

an arbiter to select one of the requests from the count table without regard to a priority level of one or more of the data units associated with the selected request; and a processing unit to process the one or more of the data units associated with the selected request for transmission to the destination addresses.

2. The system of claim 1, where the priority levels include two priority levels and each of the buffer sets includes two buffers.

3. The system of claim 1, where the arbiter is configured to select the data units from the buffers based on the priority levels of the data units.

4. The system of claim 1, where the processing unit is configured to output the selected data units with headers that contain no priority fields regarding the priority levels of the data units.

5. The system of claim 4, where the header of one of the selected data units includes at least one of a destination field that stores one of the destination addresses or a source field that stores a source address.

6. The system of claim 5, where at least one of the one of the destination addresses or the source address implicitly includes information regarding the priority level of the one of the selected data units.

7. A method performed by a processor, the method comprising:

storing data units in a plurality of buffers associated with the processor, the buffers being grouped into sets based on destinations of the data units, at least one of the buffer sets including multiple ones of the buffers corresponding to a plurality of priority levels, each of the destinations being assigned a plurality of addresses, each of the plurality of addresses corresponding to the priority levels;

tracking, in a count table associated with the processor, requests for transmission of one or more of the data units, where the data units include headers containing no priority field relating to the priority levels of the data units;

selecting, by the processor, one of the requests from the count table without regard to a priority level of one or more of the data units associated with the selected request; and outputting, by the processor, a data unit associated with the selected request according to the destination address of the data unit.

8. The method of claim 7, where the selecting the one of the data units includes:

selecting the one of the data units from the buffers based on the priority level of the one of the data units.

9. The method of claim 7, where the outputting the selected one of the data units includes:

transmitting the selected one of the data units with a header that contain no priority fields relating to the priority levels of the selected one of the data units.

10. The method of claim 9, where the header of the selected one of the data units includes at least one of a destination field that store the destination addresses or a source field that store source addresses.

11. The method of claim 10, where at least one of the destination addresses or the source addresses implicitly includes information regarding the priority levels of the data units.

12. A switch fabric, comprising:

a plurality of input links to receive data items that include destination addresses, each of the data items being associated with one of a plurality of priority levels, where the data items include headers containing no priority field relating to the priority levels of the data items;

a plurality of output links to output the data items, one of the output links being assigned a plurality of the destination addresses, each of the destination addresses corresponding to one of the priority levels;

at least one switching element comprising a count table to track requests for transmission of one or more of the data items, and an arbiter to select one of the requests from the count table without regard to the priority level of the one or more data items associated with the request, the at least one switching element to:

receive the data items associated with the selected request from the input links, map the destination addresses for the data items to the output links to identify ones of the output links to receive the data items, and send the data items to the identified ones of the output links.

13. The switch fabric of claim 12, where when sending the data items, the at least one switching element is configured to transmit the data items without regard to the priority levels of the data items.

14. The switch fabric of claim 13, where the at least one switching element is unaware of the priority levels of the data items.

15. The switch fabric of claim 12, where the at least one switching element includes:

a lookup table to map the plurality of the destination addresses to each of the output links.

16. A method for routing data items through a switch fabric that includes a plurality of input links and a plurality of output links, comprising:

receiving, from the input links of the switch fabric, data items that include a plurality of destination addresses, the data items being associated with a plurality of priority levels, where the data items include headers containing no priority field relating to the priority levels of the data items;

mapping a destination address of the destination addresses to an output link of the output links of the switch fabric to identify an output link to receive a data item of the data items, at least one of the output links being assigned a plurality of the destination addresses, each of the destination addresses corresponding to a different one of the priority levels;

selecting, from a count table that tracks requests for transmission of one or more of the data items, a request without regard to a priority level of the data item associated with the selected request, where the count table is associated with the switch fabric; and sending the data item associated with the selected request to the identified ones of the output links.

17. The method of claim 16, where the data item is routed through the switch fabric without regard to the priority level of the data item.

* * * * *